United States Patent [19]

Snyder

[11] 3,909,779

[45] Sept. 30, 1975

[54] VEHICLE GAGE ALERT SYSTEM USING LIGHT EMITTING DIODES

[75] Inventor: George D. Snyder, Oak Park, Mich.

[73] Assignee: Chrysler Corporation, Highland Park, Mich.

[22] Filed: Mar. 22, 1974

[21] Appl. No.: 453,891

[52] U.S. Cl. .................... 340/52 F; 340/57; 340/59
[51] Int. Cl.² ........................................... B60Q 1/00
[58] Field of Search .......... 340/52 F, 52 R, 59, 336, 340/412, 413, 414, 415

[56] References Cited
UNITED STATES PATENTS 3,626,367  12/1971  Howard ............................. 340/52 F Primary Examiner—Alvin H. Waring
Attorney, Agent, or Firm—Talburtt & Baldwin

[57] ABSTRACT

Light emitting diodes are used on the engine temperature gage and the fuel gage of a motor vehicle to indicate to the driver a condition requiring his attention. The light emitting diode for the engine temperature gage is energized when the temperature of the engine exceeds a predetermined safe operating value. In the fuel gage, a light emitting diode is energized when the fuel level in the fuel tank is less than a predetermined level. A solid state switching circuit is responsive to the gage sender unit for energizing the light emitting diode associated with that gage.

7 Claims, 7 Drawing Figures

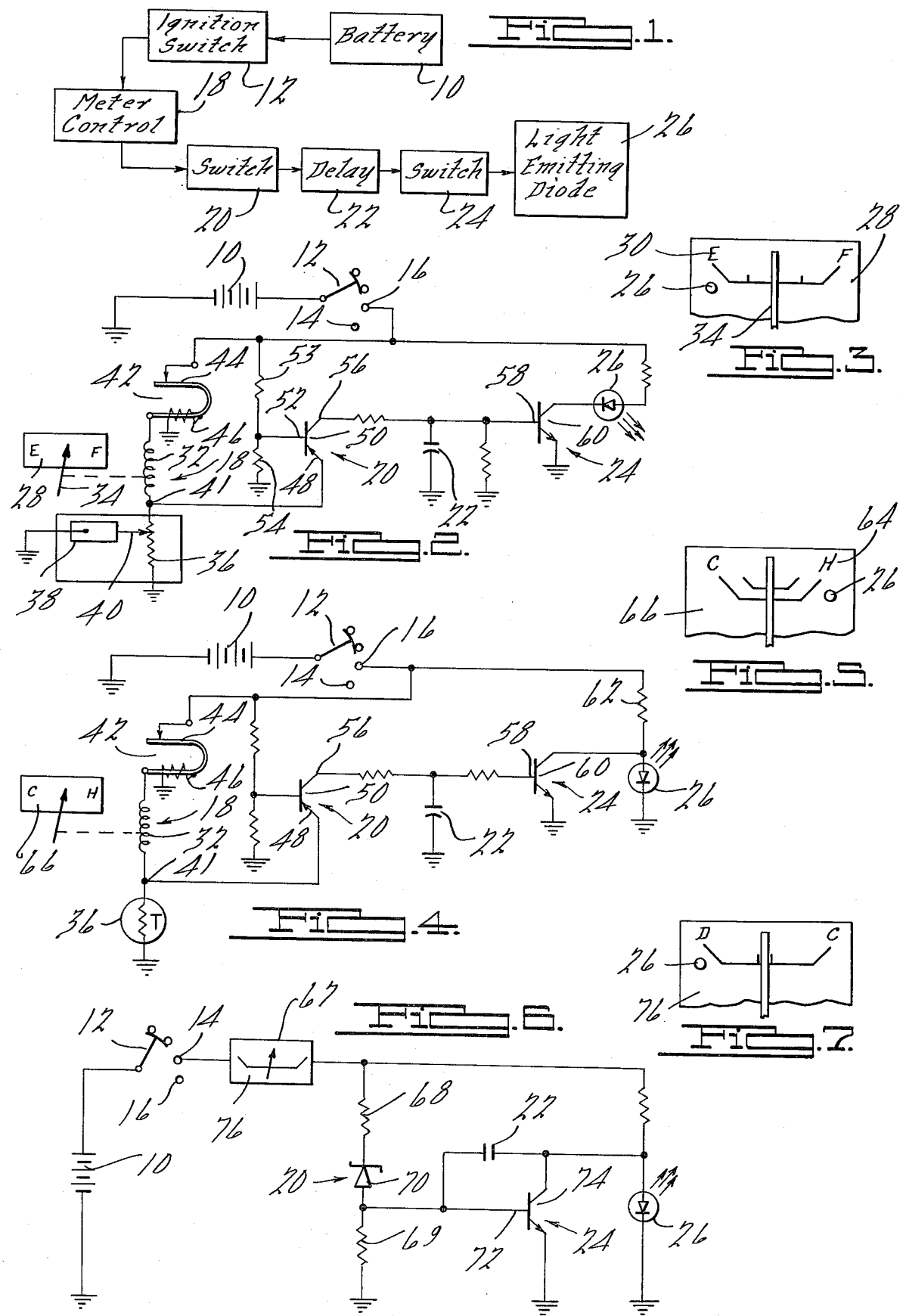

VEHICLE GAGE ALERT SYSTEM USING LIGHT EMITTING DIODES

BACKGROUND OF THE INVENTION

1. Field of Invention

This invention relates in general to motor vehicle gaging systems, and more particularly, to solid state electronic gaging systems utilizing both meters and warning lights.

2. Prior Art

Prior art gaging system for motor vehicles typically utilize voltage or current responsive meters for indicating the level of fuel in the fuel tank or engine coolant temperature. Such gages are analog type devices having a meter pointer which moves across the face of a dial graduated in increments from a full fuel indicating position to an empty fuel indicating position. Other than by the position of the pointer on the dial face, the vehicle operator has no unusual indication of a low fuel condition.

A useful addition to a vehicle fuel gaging system is a light emitting signal display on the instrument panel that is activated when the fuel level is low.

SUMMARY OF INVENTION

It is a principal object of this invention to illuminate a signal lamp, particularly a light emitting diode, whenever a vehicle condition requires an operator's attention.

It is another object of this invention to provide both an analog indication by means of a meter of a vehicle condition and also a digital indication by means of a light emitting diode of a vehicle condition requiring an operator's attention.

It is further an object of this invention to locate both the analog indication and the digital indication of a vehicle condition at the same position on an instrument panel of a motor vehicle.

It is still another object of this invention to combine the digital indication as represented by a light emitting diode with the analog indication as represented by a voltage or current responsive meter on the same instrument and in the appropriate location on the face of the instrument.

These and other objects will become apparent from the following drawings, detailed description and claims of a gage alert system utilizing a light emitting diode on the face of the gage and a solid state circuit responsive to the existing gage movement for energizing the diode. The solid state circuit comprises a pair of solid state switches having a delay means interposed in the circuit between the switches. The first switch is responsive to a predetermined magnitude or level of the variable signal generated by the sender unit of the existing gage. The output of the first switch, which through biasing reflects a predetermined vehicle operating condition needing attention, switches the conductive state of the second or output switch for turning on the light emitting diode.

DESCRIPTION OF THE DRAWINGS

In the Drawings

FIG. 1 is a block diagram of the gage alert system of the present invention;

FIG. 2 is a schematic of one embodiment of the system of FIG. 1 as applied to a fuel gage;

FIG. 3 is an illustration of the positioning of the light emitting diode on the fuel gage;

FIG. 4 is a schematic of another embodiment of the system of FIG. 1 as applied to a temperature gage;

FIG. 5 is an illustration of the positioning of the light emitting diode on the temperature gage;

FIG. 6 is a schematic of another embodiment of the system of FIG. 1 as applied to the electrical system;

FIG. 7 is an illustration of the positioning of the light emitting diode on the ammeter gage.

DETAILED DESCRIPTION

Referring to the Figs. by the characters of reference, there is illustrated in FIG. 1, a block diagram of the basic gage alert system. In particular, FIG. 1 comprises the battery 10 which is the source of power and is electrically connected to the ignition switch 12 of the vehicle. The battery 10 represents the vehicle source of electrical energy, including the storage battery and the alternator and its control.

In most vehicles, the ignition switch 12 controls the application of electrical power to the several electrical systems of the vehicle in order to prevent discharge of the battery 10 when the vehicle is not being operated. In the Figs., the start 14 and run 16 positions of the ignition switch 12 are used as the output of the switch.

Electrical power from the ignition switch 12 is supplied to the particular gage or meter control 18 located on the instrument panel to which the gage alert system is adapted. The first switching means 20 is responsive to the voltage developed at the output terminal of the meter control unit 18. The output of the first switch means 20 is electrically passed through a delay means 22 for smoothing out any extraneous or short duration voltage spikes.

The output of the delay means 22 is electrically applied to a second switch means 24 which operates to control the condition of a light emitting diode 26. The light emitting diode 26 is electrically connected in circuit to the output of the second switch means 24.

Thus, when the voltage signal at the output terminal of the meter control unit 18 is at or above a predetermined first voltage level, the first switch means 20 is in conduction driving the second switch means 24 into conduction. In a similar manner when the output of the meter control unit 18 is at a voltage level, which is less than the first voltage level, neither switch means 20 or 24 are in conduction.

Referring to FIGS. 2 and 3, there is illustrated the schematic and fuel gage face 28 of the gage alert system as adapted to a fuel warning system. As illustrated in FIG. 3, the light emitting diode 26 is positioned on the front face 28 of the gage adjacent to the empty fuel indicator 30. In this position, the operator can by glancing at the gage be quickly alerted to a low fuel level by means of the light emitting diode 26 being illuminated and also be aware of the actual fuel level as indicated by the analog read out of the gage face 28. In the preferred embodiment, the light emitting diode 26 is illuminated when the fuel tank is one-eighth full.

The meter control unit 18 of fuel gage comprises a field or heater coil 32 for causing displacement or rotation of a pointer 34 across the gage face 28 and a resistive sending unit 36 electrically connected in series. The coil 32 is mounted on the gage on the instrument panel and the resistive sending unit 36 is positioned in the fuel tank.

As illustrated in FIG. 2, as the fuel level decreases, the float 38 moves a wiper 40 across the resistance 36 thereby changing or increasing the value of circuit resistance. As the value of the resistance 36 increases, the voltage drop across meter coil 32 decreases causing the pointer 34 to move to the left or in a counter clockwise direction as shown in FIG. 2 to indicate a decreasing fuel level condition. The decreased voltage at the terminal junction 41 of the coil 32 and the sender 36 is electrically supplied to the first switch means 20.

The illustrated gaging system is of the type known as the constant voltage thermal variety in which the fuel gage employed therein is a current responsive gage. To maintain system accuracy, the voltage supplied to operate the gage heater coil 32 associated with the thermally actuated pointer displacement device must be limited to or, more properly, accurately maintained at a substantially constant value. This is accomplished by means of a bimetal voltage limiter 42 electrically connected between the coil 32 and the source of power 10. As the source of power 10 is applied to the bimetal switch 44, the current flows through the gage coil 32 and also the heating coil 46 of the bimetal switch 44. When the bimetal coil 46 has dissipated a known amount of heat, the bimetal switch 44 opens, removing power from the gage coil 32. A short period of time later, the bimetal coil 46 cools and the switch 44 recloses. In the preferred embodiment, this modulation occurs at a rate of approximately 60 cycles per minute and the gage coil 32 and serially connected sender unit 36 electrically see a d.c. average voltage level of approximately 5.3 volts from a 12 volt battery.

When the resistance of the sending unit 36 is low, approximately 10 ohms as is the case with a full tank of fuel, the float-actuated slider is positioned at or near the end of resistor 36 adjacent terminal 41, the voltage at the meter-sender terminal junction 41 is at a low voltage near ground level. This voltage is electrically connected as an input to the emitter 48 of the first transistor 50 in the first electronic switch means 20 of the subject gage alert system. The base 52 of the PNP illustrated transistor is biased to a predetermined level by means of the two series resistors 53 and 54. The amplitude of the modulating voltage signal at the emitter 48, level, is below the base bias level and the first means 20 is out of conduction. This electrically causes the second electronic switch means 24 to be out of conduction and, therefore, no current flows through the light emitting diode 26.

As the fuel level decreases, the sender resistance 36 increases until, at about the one-eighth full level, the voltage on the emitter 48 of the first transistor 50 exceeds the base bias voltage level, and the first transistor 50 is driven into conduction.

The signal from the collector 56 is delayed by the delay means 22, such as a capacitor until it is charged up to the voltage level of the collector 56. Since this is a modulated or pulsating voltage level, the effect of the capacitor 22 is to level or smooth out the voltage signal applied to the base 58 of the second transistor 60, which is illustrated as of the NPN conductivity type. Once the base voltage of the second transistor 60 reaches the level for conduction, the transistor 60 turns on and current is drawn through the light emitting diode 26 which is shown connected in series with the current carrying output electrodes of the transistor for energization from the vehicle voltage source 10 through the ignition switch.

At this time the gage pointer 34 is positioned between the "E" or "empty" mark 30 and the first scale graduation mark to its right in FIG. 3. The light emitting diode 26 is illuminated, and both the analog information by means of the pointer 34 and the digital information by means of the light emitting diode 26 is communicated to and within the same field of view of the vehicle operator.

As previously indicated, the capacitor 22 functions as a delay to prevent any short duration voltage spikes from being applied to the base 58 of the second transistor 60. Such spikes may be due to fuel sloshing in the fuel tank, or turning or bumpy road conditions thereby giving a false indication of fuel level.

The circuit of FIG. 4 is similar in operation to the circuit of FIG. 2. The difference resides in that a high voltage on the emitter 48 of the transistor 50 of the first switch means 20 indicates a low temperature condition. This causes the transistor 60 of the second switch means 24 to be in conduction thereby shunting and extinguishing the light emitting diode 26, which is shown connected in shunt or across the output electrodes of output switching transistor 60 and in series with resistor 62.

When the temperature is high, the resistance of sender 36 is low, thereby applying a low voltage to the emitter 48 of the first transistor 50 and the first transistor 20 is driven out of conduction inasmuch as the base bias is not exceeded. This in turn drives the second transistor 60 out of conduction and allows current to flow through the series resistor 62 and light emitting diode 26 to energize the latter which signals or warns the vehicle operator of a high temperature condition. The sender unit 36 is a negative temperature coefficient thermistor.

Referring to FIG. 5, the light emitting diode 26 is positioned adjacent the high temperature end 64 of the gage dial face 66 and is illuminated when the temperature exceeds a predetermined level, requiring operator attention.

Referring to FIG. 6, there is illustrated in schematic form the system as applied to a shunt ammeter 67 circuit in the vehicle. In this application, when the battery 10 is at a first voltage level indicating a good battery voltage level or charge condition, the light emitting diode 26 is not illuminated.

The first switch means 20 in FIG. 6 comprises a series circuit of two resistors 68 and 69 having a zener diode 70 interposed in circuit between the resistors. One end of the circuit, the end electrically connected to the cathode of the zener diode 70, is electrically connected to the output of the ammeter coil not shown, the ammeter being of the common shunt type variety. The opposite end of the series circuit is connected to ground.

When the voltage level at the output of the ammeter 67 is high, indicative of a good battery, the zener diode 70 is in conduction. This places a forward bias 72 on the base of the transistor 74 or second switch means, driving the transistor into conduction. With the transistor 74 acting as a shunt to the light emitting diode 26, the diode is not in conduction when the transistor 74 is conducting.

When the voltage level at the output of the ammeter 67 is low, indicative of a discharging or discharged battery, the first switch means 20 or zener circuit is out of conduction. This places a reverse bias level on the base 72 of the transistor 74, driving it out of conduction and allowing current to flow through the light emitting diode 26. The light emitting diode is now illuminated indicating the need for operator attention.

The capacitor 22 functions as a delay means for delaying the turning on of the light emitting diode 26 due to short duration voltage spikes caused by sudden, heavy loads on the electrical system. Such load are due to the headlights being turned on, the directional signals or flashers being turned on or other similar loads.

FIG. 7 illustrates the positioning of the light emitting diode 26 on the face 76 of the ammeter adjacent to the discharge indication of the gage.

In each of the circuits illustrated in FIGS. 2, 4 and 6, the second switch means 24 may be a darlington amplifier for reasons of power dissipation.

There has thus been illustrated and described a gage alert system providing both digital and analog output signals for the instrument panel gages in a motor vehicle. This digital output is represented by a light emitting diode positioned at the end of the gage face to indicate a need for operator attention. The analog indication is represented by the movement of the pointer across the gage face.

What is claimed is:

1. A motor vehicle gage alert system comprising:
a source of power including a battery,
an ignition switch connected to said source of power,
gage control and condition responsive means operable from said source of power for generating a first signal which varies continuously in accordance with the condition sensed thereby and operates said gage to provide a display which varies accordingly,
switch means responsive to said first signal when it attains a predetermined level for generating an actuation signal,
delay means responsive to and delaying said actuation signal from said switch means;
a switching transistor having its input electrically connected for receiving said delayed signal from said switch means, and
a light emitting diode electrically connected in the output circuit of said switching transistor and energized in accordance with whether said first signal from said gage control means has attained said predetermined level to alert the operator to a sensed motor vehicle condition requiring attention.

2. In a motor vehicle gage alert system according to claim 1 wherein said light emitting diode is electrically connected in series with the output of said switching transistor and is energized when said switching transistor is driven into conduction by said delayed signal.

3. In a motor vehicle gage alert system according to claim 1 wherein said light emitting diode is electrically connected in shunt with the output of said switching transistor and said light emitting diode is energized when said switching transistor is driven out of conduction by said delayed signal.

4. In a motor vehicle gage alert system according to claim 1 wherein said first switch means is a transistor having its output circuit electrically connected in series between said gage control means and the input of said switching transistor.

5. In a motor vehicle gage alert system according to claim 1 wherein said switch means is a zener diode having its cathode electrically connected to the output of said gage control means and its anode electrically connected through a series resistor means to the return of said source of power, said zener diode generating said actuation signal at its anode when said zener diode is out of conduction.

6. In a motor vehicle gage alert system according to claim 2 further wherein the condition sensed by said condition responsive means is a low fuel level condition and said switch means is energized to provide said actuation signal when said sensed fuel level falls below a predetermined level.

7. In a motor vehicle gage alert system according to claim 3 wherein the condition sensed by such condition responsive means is a high temperature condition and said switch means is energized when said first signal falls below a predetermined level.

* * * * *